Jan. 16, 1940.  W. FLECHSIG  2,187,022
METHOD OF TREATING LUMINESCENT MATERIALS
Filed July 3, 1939
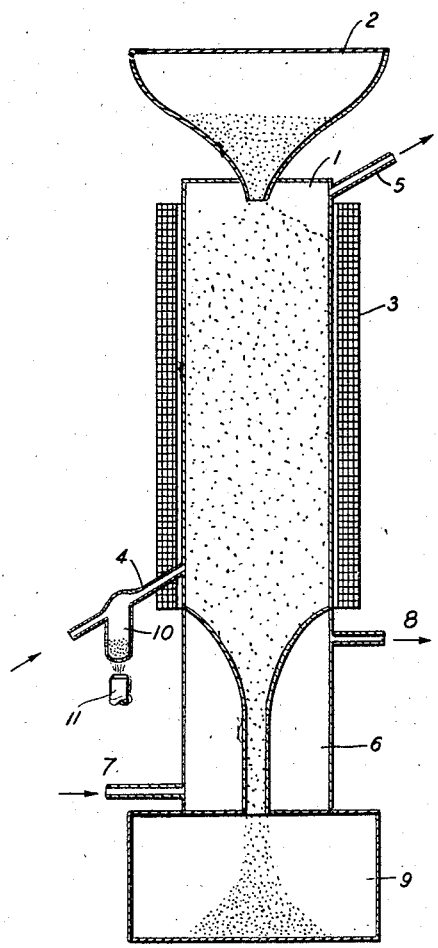
INVENTOR
W. FLECHSIG
BY
*Chas Sprague.*
ATTORNEY Patented Jan. 16, 1940

2,187,022

UNITED STATES PATENT OFFICE 2,187,022

METHOD OF TREATING LUMINESCENT MATERIALS

Werner Flechsig, Berlin-Charlottenburg, Germany, assignor to Fernseh Aktiengesellschaft, Berlin-Zehlendorf, Germany, a company of Germany Application July 3, 1939, Serial No. 282,743
In Germany June 23, 1938

7 Claims. (Cl. 250—81)

This invention relates to the production of luminescent materials and more particularly to the treatment of luminescent materials used as luminescent screens in cathode ray tubes.

It is known that most inorganic luminescent materials, particularly the Lenard phosphors, have the property of losing their luminescent quality under the influence of pressure. This is particularly disadvantageous if the luminescent material is crushed in a mortar. The production of powdered phosphors is thereby considerably complicated. A proper treatment restores the luminescent quality of the material.

It has been shown that subsequent heating to about 100° C. is practically without influence upon the luminescent quality, while heating to a higher temperature restores the loss of luminescence, but, on the other hand, causes the particles to bake together again.

According to the present invention, the luminescent material in finely divided form is caused to drop through a hot gaseous zone and then through a cooling zone, whereby the individual particles come in contact only after their temperature has been reduced to such a degree that they can no longer bake together. In most cases, the luminescence which the material possessed before crushing is restored without baking the individual particles together. Further increase in luminescence can be accomplished by chilling the particles after they have passed through the hot zone. This produces interior tension in the particles, which increases their luminescence. Furthermore, the particles are caused to drop through a zone of inert gas. It is preferable in some cases to apply a pressure to the gas which is higher than that of the surrounding air. It is also possible to add in the inert medium individual components of the luminescent material—for sulphides, for instance, sulphur—as well as certain quantities of the activating metal, as vapors.

The drawing schematically shows an embodiment of the invention. A long tubular oven 1 possesses a cone-shaped portion 2 which serves to supply the luminescent material to the portion of the oven beneath it. The oven is surrounded by a heater winding 3 which enables the production and maintenance of the desired temperature in the interior of the oven. A substantially inert gas enters the oven at tube 4 and leaves it through tube 5. The bottom end of the oven is conical and is surrounded by a cooling body 6 through which a cooling means, for example, water, is caused to flow. This water enters at 7 and leaves at 8. Receptacle 9 is placed underneath the oven to catch the particles of luminescent material. The whole arrangement can be so constructed tat a pressure is produced in the oven in excess of that of the surrounding air.

The oven is first heated to a temperature of the order of 900° C. In some cases it may be preferable to go to higher temperatures because of the comparatively short time the particles are in the hot zone. After admission of the inert gaseous medium, for example, nitrogen, and after operating the cooling means, it is necessary to wait until a comparatively good temperature equilibrium has been reached. The luminescent material to be regenerated is then put into receptacle 2. Shaking or stirring means (not shown) can be provided, if desired, in order to mix the luminescent particles. The particles then fall, in finely divided form, through the free space of the oven. They are then chilled in the cool portion of the oven and finally fall into receptacle 9. If individual components of the luminescent material are to be added in the gaseous medium, this is preferably done by mixing vapors of the material to be added to the inert gas. For sulphides, sulphur vapor is introduced. For this purpose a bottle-shaped receptacle 10 in which sulphur, for example, can be evaporated by any suitable means, such as the burner 11, is connected with the tube 4. The vapor pressure in the enclosed space corresponds to the lowest temperature in this space. The vapor would thus condense in the lower part of the oven. In the method according to the invention, however, the vapor enters at a high temperature and is introduced immediately into the zone of high temperature. Thus a comparatively constant concentration is secured. The process can be carried out similarly also for other additions.

What is claimed is:

1. The method of treating a fluorescent or phosphorescent material in finely divided form to increase its luminescent property, which comprises the steps of passing said material in said finely divided form into a zone containing gas, maintaining the gas in the upper part of said zone in a relatively hot state, maintaining the gas in the lower portion of said zone in a relatively cold state, permitting said particles to fall through said portions of said zone in succession, and utilizing movement of the molecules of said gas to prevent said particles from coming in contact and adhering to each other until after their temperature has been lowered to a point where they can no longer bake together, whereby said finely divided form is maintained.

2. The method of treating a fluorescent or phosphorescent material in finely divided form to increase its luminescent property, which comprises the steps of passing said material in said finely divided form into a zone containing gas, maintaining the gas in the upper part of said zone in a relatively hot state, maintaining the gas in the lower portion of said zone in a relatively cold state, constantly supplying oxygen-free gas in the lowermost part of the heated portion and constantly removing gas from the uppermost part of said portion, permitting said particles to fall through said portions of said zone in succession, and utilizing movement of the molecules of said gas to prevent said particles from coming in contact and adhering to each other until after their temperature has been lowered to a point where they can no longer bake together, whereby said finely divided form is maintained.

3. The method of treating a fluorescent or phosphorescent material in finely divided form to increase its luminescent property which comprises the steps of passing said material in said finely divided form through a zone of oxygen-free gas, supplying heat to said gas, and cooling said material while in said finely divided form by passing it through a zone of cold gas.

4. The method of treating a fluorescent or phosphorescent material in finely divided form to increase its luminescent property which comprises the steps of causing said material in said finely divided form to fall through a zone of gas containing a chemical element which is a constituent part of said material, supplying heat to said zone, and cooling said material while in said finely divided form.

5. The method of treating a fluorescent or phosphorescent material in finely divided form to increase its luminescent property which comprises the steps of passing said material in said finely divided form through a zone of oxygen-free gas containing a chemical element which is a constituent part of said material, supplying heat to said zone, and cooling said material while in said finely divided form.

6. The method of treating fluorescent or phosphorescent material comprising a sulphur salt, said material being in finely divided form, to increase its luminescent property, which comprises the steps of passing said material in said finely divided form through a zone of gas containing sulphur vapor, supplying heat to said zone, and cooling said material while in said finely divided form.

7. The method of treating fluorescent or phosphorescent material in finely divided form to increase its luminescent property, which comprises the steps of passing said material in said finely divided form through a gaseous zone, supplying heat to said zone, continuously supplying to said zone in gaseous form a chemical element which chemically reacts with said material in said heated zone, vaporizing said element before supplying it to said zone, and cooling said material after its passage through said zone.

WERNER FLECHSIG.